United States Patent
Montgomery (10) Patent No.: US 8,882,449 B2
(45) Date of Patent: Nov. 11, 2014

(54) INNER-TO-OUTER SHELL DIFFERENTIAL EXPANSION MEASUREMENT

(75) Inventor: Michael Earl Montgomery, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 583 days.

(21) Appl. No.: 13/271,350

(22) Filed: Oct. 12, 2011

(65) Prior Publication Data

US 2013/0094940 A1  Apr. 18, 2013

(51) Int. Cl.
*F01D 25/26* (2006.01)
*F01D 25/00* (2006.01)
*F01K 11/02* (2006.01)
*G01B 21/32* (2006.01)

(52) U.S. Cl.
CPC ............... *F01D 25/26* (2013.01); *G01B 21/32* (2013.01)
USPC ........................................................ 415/118

(58) Field of Classification Search
CPC ......... F01D 25/26; G01B 21/32; G01B 5/043
USPC ........... 415/118, 214.1; 60/670; 702/33, 136; 73/112.02; 33/1 BB, 809, 810, 811, 542
See application file for complete search history.

(56) References Cited

U.S. PATENT DOCUMENTS

| | | | | |
|---|---|---|---|---|
| 3,208,722 A | * | 9/1965 | Rodriquez et al. | 415/122.1 |
| 4,302,963 A | * | 12/1981 | Collins | 73/866.5 |
| 4,492,034 A | * | 1/1985 | Nishina et al. | 33/558 |
| 5,388,960 A | * | 2/1995 | Suzuki et al. | 415/176 |
| 5,414,940 A | * | 5/1995 | Sturdevant | 33/559 |
| 7,985,045 B2 | * | 7/2011 | Narita et al. | 415/14 |
| 2005/0016175 A1 | * | 1/2005 | Barber et al. | 60/696 |
| 2010/0008756 A1 | * | 1/2010 | Inomata et al. | 415/14 |

* cited by examiner

*Primary Examiner* — Ned Landrum
*Assistant Examiner* — Brian O Peters
(74) *Attorney, Agent, or Firm* — Hoffman Warnick LLC; Ernest G. Cusick (57) ABSTRACT

A shell differential expansion detector and turbomachine including a detector are disclosed. In an embodiment, the shell differential expansion detector device includes a housing; and a first rod including a distal part extending through a first opening in the housing. The first rod further includes a proximal part within the housing. A sleeve surrounds the distal part of the first rod on an exterior of the housing; and an actuator arm is affixed to the first rod. A second rod is disposed in physical contact at a distal end thereof with the actuator arm; and a shell expansion detector is operably connected with the second rod at a proximal end thereof.

20 Claims, 5 Drawing Sheets

INNER-TO-OUTER SHELL DIFFERENTIAL EXPANSION MEASUREMENT

BACKGROUND OF THE INVENTION

The invention relates generally to turbomachines such as steam turbines. More particularly, the invention relates to a shell differential expansion detector for detecting axial differential expansion between an inner and outer shell of the turbomachine.

Turbomachines such as gas and steam turbines typically include a centrally-disposed rotor that rotates within a stator. A working fluid flows through one or more rows of circumferentially arranged rotating blades that extend radially outwardly from the rotor shaft. The fluid imparts energy to the shaft, which is used to drive a load such as an electric generator, compressor, or pump.

Steam turbines in particular are typically divided into sections based on the applied cycle, steam conditions, and mechanical design constraints for a particular application. In general, a steam turbine unit includes one or more sections. The steam conditions for each section vary, resulting in high-, intermediate- (no reheat), reheat-, and low-pressure sections. Particularly as higher pressure and temperature steam conditions have been applied to these sections, double shell construction is desirable to contain the steam within the appropriate section.

Mechanical constraints require that the inner and outer shells be connected to one another at an axial position along their longitudinal extent. The connection point may also be called a fit. During operation, the interior of the turbine is heated and cooled by convection from the steam at its surface, radiation from other adjacent hot surfaces, and conduction within the shells during operation of the turbomachine. Typically the rotor heats first, resulting in expansion of the rotor, known as a long rotor condition. Steam then heats the inner shell and finally the outer shell, causing expansion of the respective shell members. Heating and cooling of the inner and outer shells changes with time; steam conditions including pressure, temperature, and flow; turbomachine load; and other factors. As a result, the axial expansion undergone by the outer and inner shells may vary significantly throughout the operation of the turbomachine.

In order to prevent axial rubbing of the stationary and rotating parts of the turbomachine over the variety of expanded and contracted positions, and to provide sealing of the stages within the sections and regions where the rotor protrudes through the inner and outer shells into the outside environment, the axial differential expansion of the rotor relative to the outer shell may be measured. However, this measurement fails to provide a direct measurement of the relative expansion of the rotor and the inner shell, where the axial clearance between the rotating and stationary parts is established. This lack of direct measurement of inner shell expansion may lead to uncertainty in the differential clearances and compromise stage and shaft sealing.

BRIEF DESCRIPTION OF THE INVENTION

A first aspect of the disclosure provides a shell differential expansion detector device including a housing; a first rod including a distal part extending through a first opening in the housing and a proximal part within the housing; a sleeve surrounding the distal part of the first rod on an exterior of the housing; an actuator arm affixed to the first rod; a second rod in physical contact at a distal end thereof with the actuator arm; and a shell expansion detector operably connected with the second rod at a proximal end thereof.

A second aspect of the disclosure provides a turbomachine comprising a rotor; a stator surrounding the rotor; an inner shell; an outer shell; and a shell differential expansion detector device. The shell differential expansion detector device includes: a housing; a first rod including a distal part extending through a first opening in the housing and a proximal part within the housing; a sleeve surrounding the distal part of the first rod on an exterior of the housing; an actuator arm affixed to the first rod; a second rod in physical contact at a distal end thereof with the actuator arm; and a shell expansion detector operably connected with the second rod at a proximal end thereof.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with the operation of a steam turbine. Although embodiments of the invention are illustrated relative to a turbomachine in the form of a steam turbine, it is understood that the teachings are equally applicable to other turbomachines having more than one shell, including inner and outer shell configurations and three membrane configurations. Further, at least one embodiment of the present invention is described below in reference to a nominal size and including a set of nominal dimensions. However, it should be apparent to those skilled in the art that the present invention is likewise applicable to any suitable turbine and/or turbomachine. Further, it should be apparent to those skilled in the art that the present invention is likewise applicable to various scales of the nominal size and/or nominal dimensions.

Figure 1:
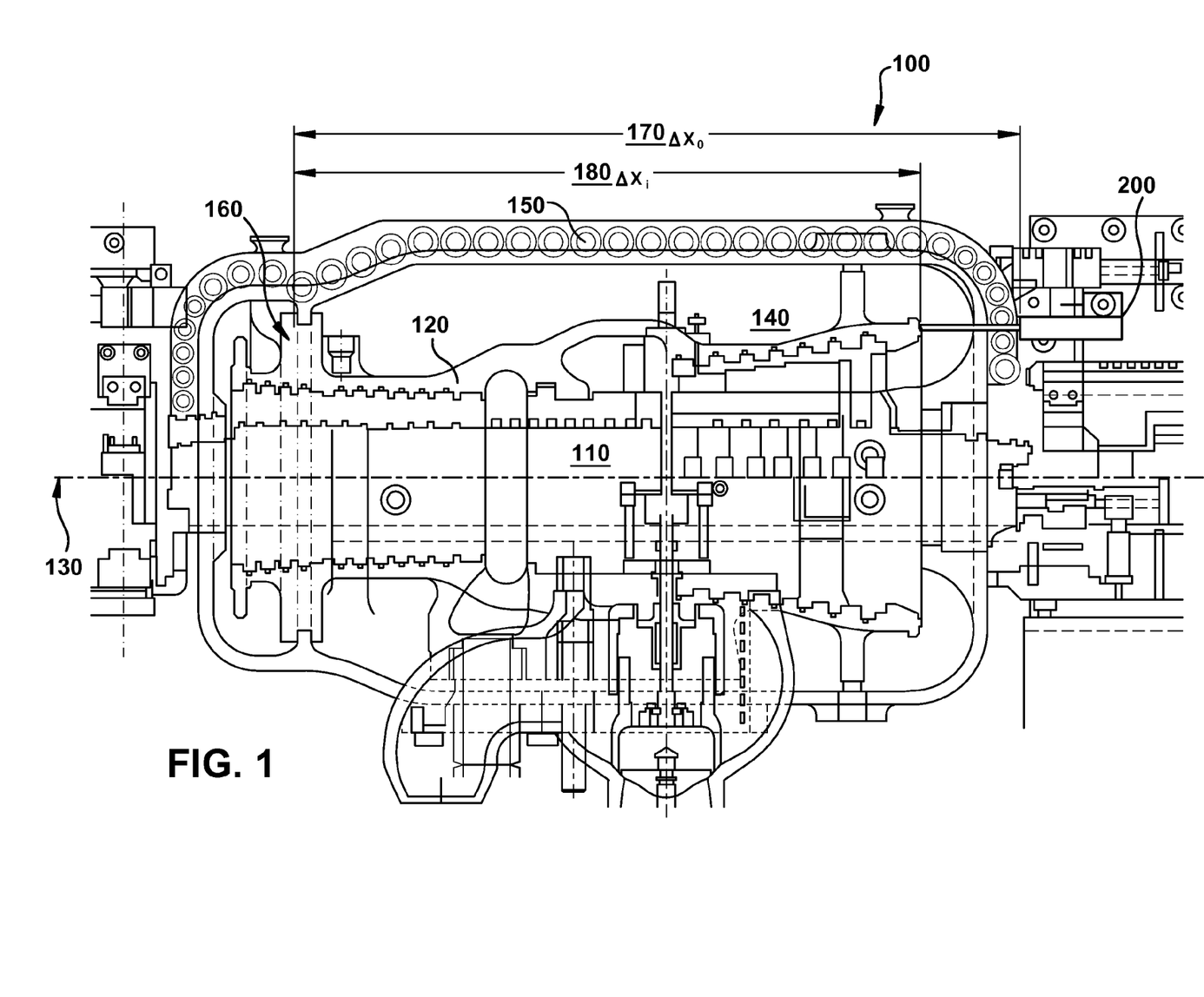
FIG. 1 shows a two-shell section of a steam turbine in accordance with an embodiment of the invention.
Figure 2:
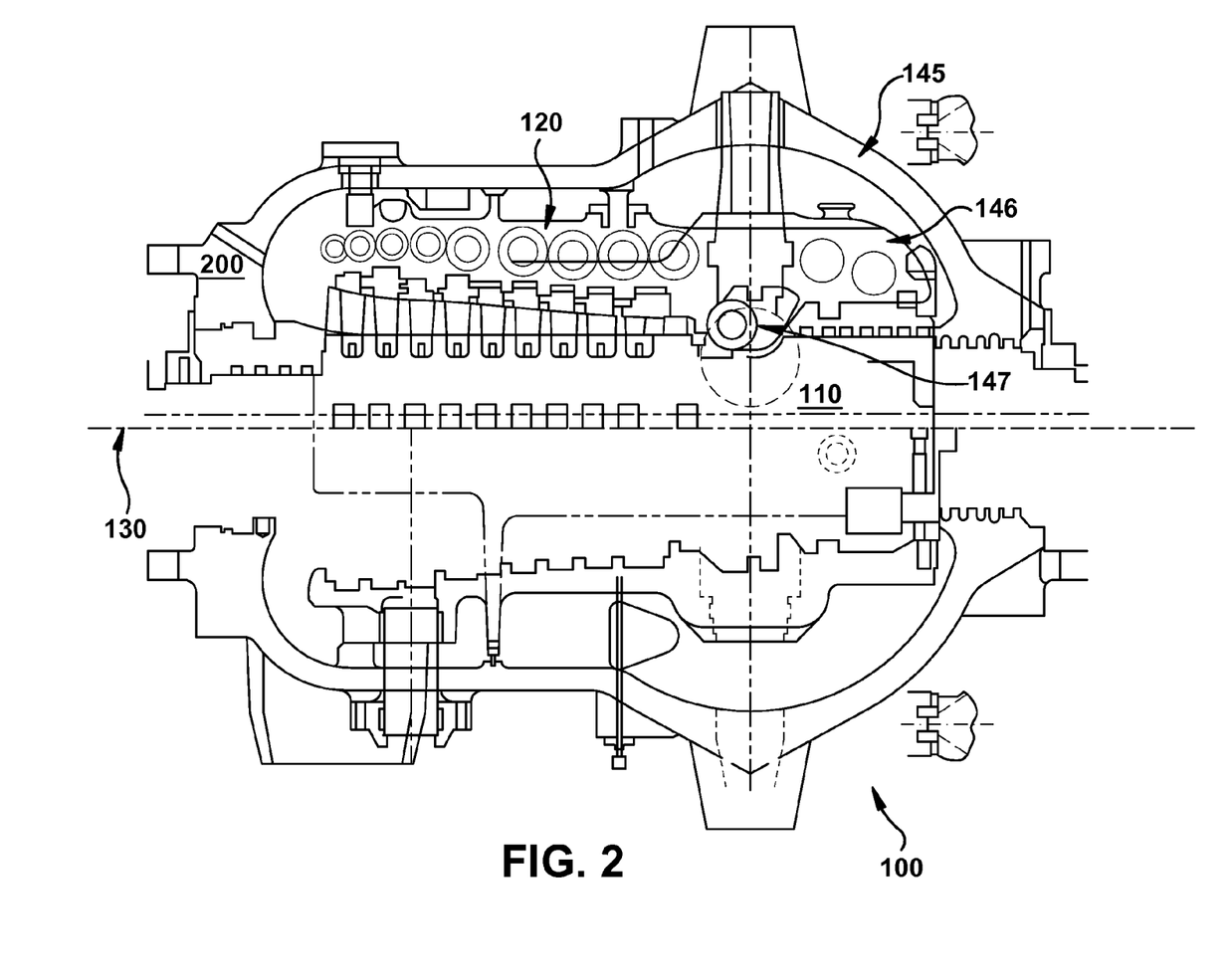
FIG. 2 shows a three membrane section of a steam turbine in accordance with an embodiment of the invention.
Figure 3:
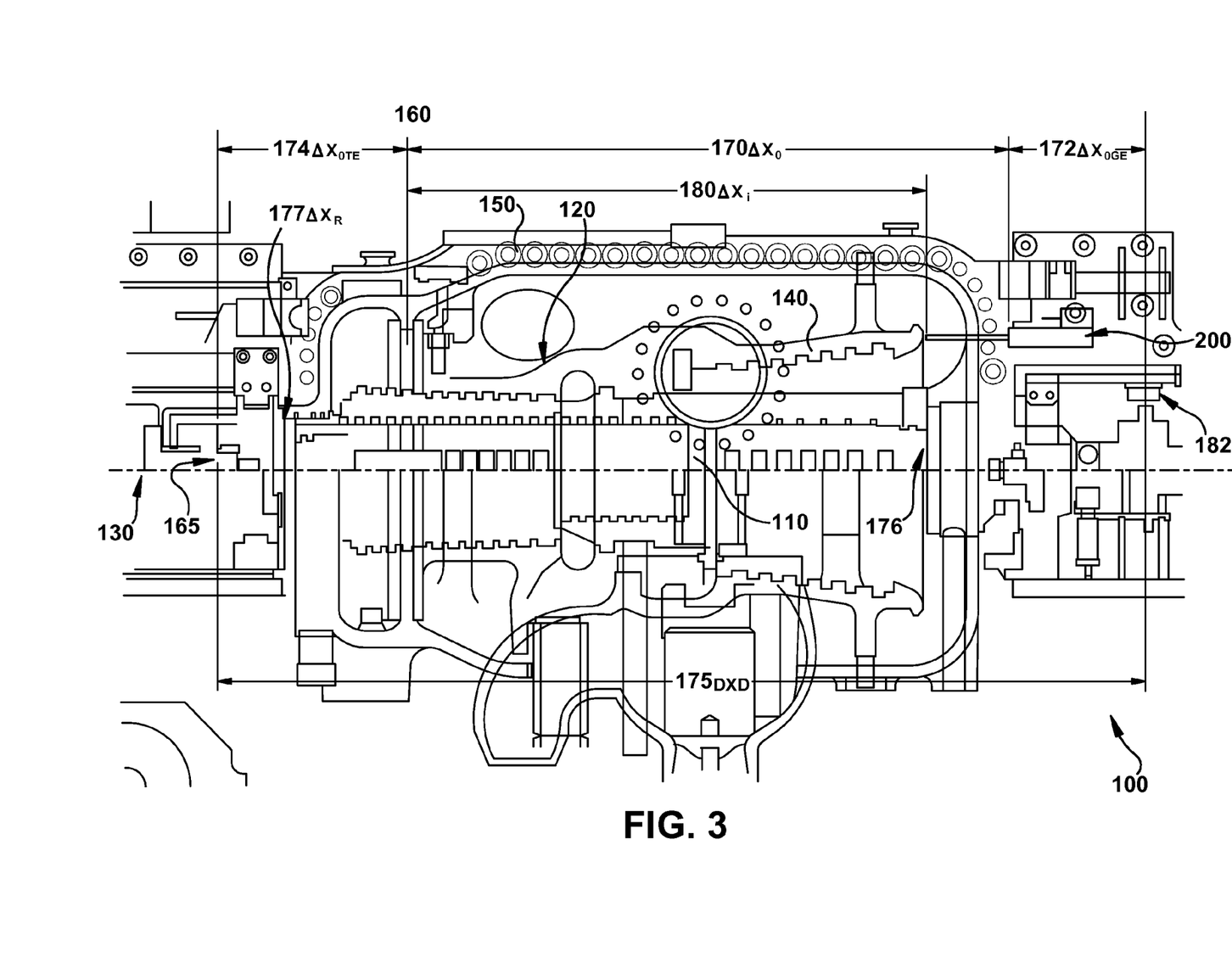
FIG. 3 shows a section of a steam turbine in accordance with an embodiment of the invention.

As indicated above, aspects of the invention provide a shell differential expansion detector device 200 and a turbomachine 100 including the same. In particular, FIGS. 1-3 show cross sectional views of turbomachine 100 including rotor 110 and stator 120. Rotor 110 is positioned within and surrounded by stator 120, where it rotates about longitudinal axis 130. As shown in FIGS. 1 and 3, inner shell 140 and outer shell 150 may contain steam within turbomachine 100, and are joined to one another at axial connection point 160. In other embodiments, such as shown in FIG. 2, stator 120 may include three membranes, such as outer shell membrane 145, inner shell membrane 146, and nozzle box membrane 147. Shell differential expansion detector 200 may be mounted on an exterior of outer shell 150 at an opposite end from axial connection point 160, and may be at an opposite end from axial connection point 160 as shown in FIG. 1.

Figure 4:
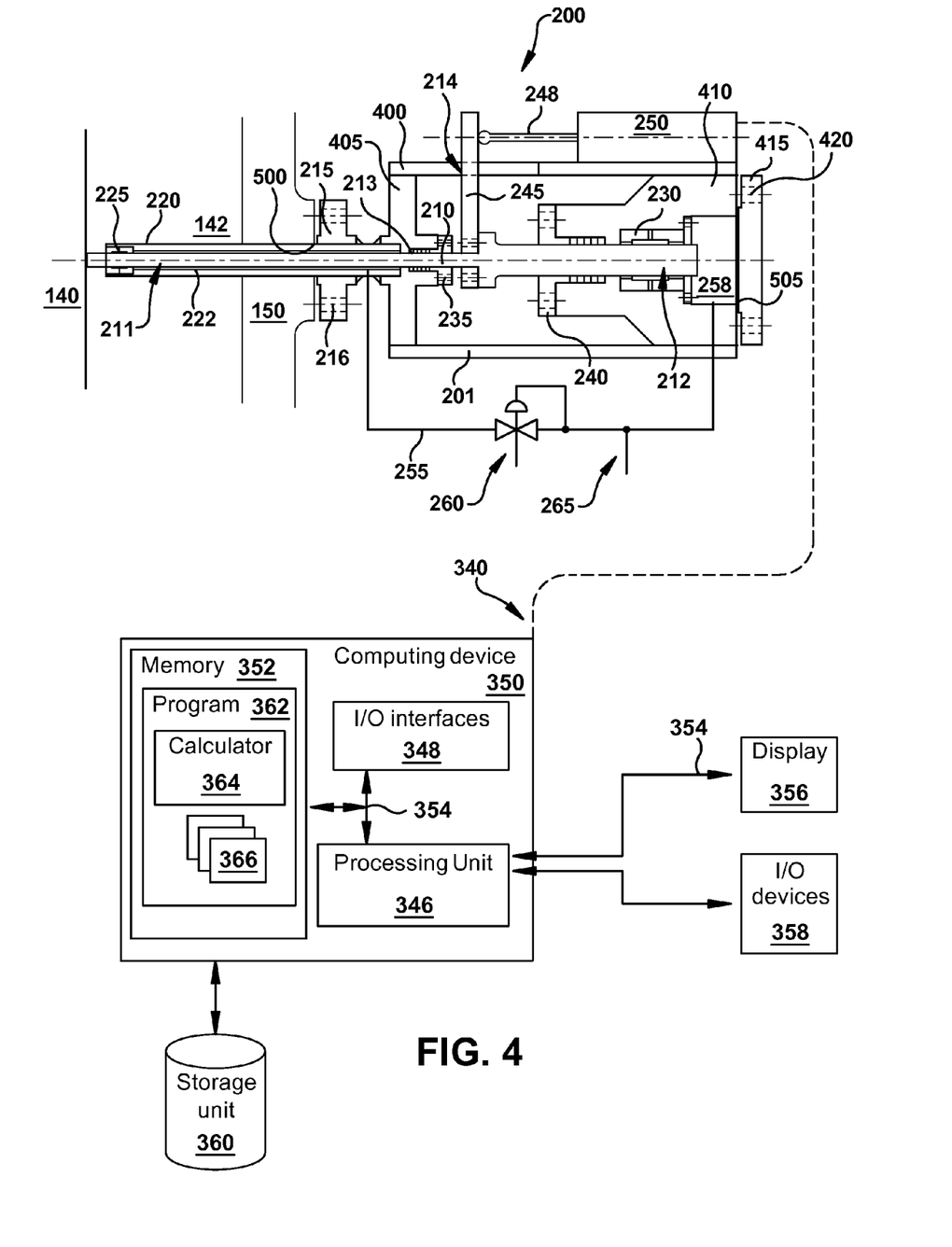
FIG. 4 shows a shell differential expansion detector in accordance with an embodiment of the invention.
Figure 5:
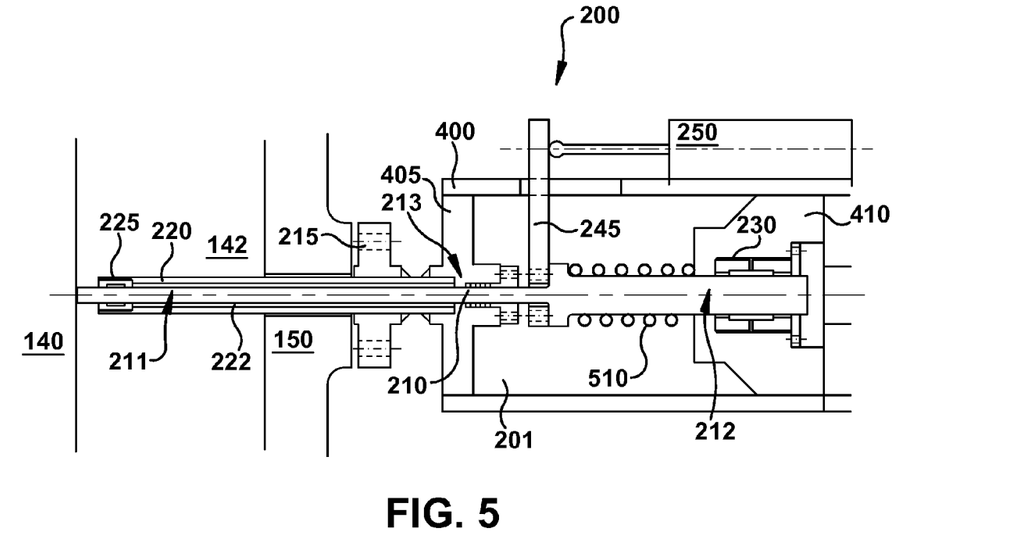
FIG. 5 shows a shell differential expansion detector in accordance with an embodiment of the invention.
Figure 6:
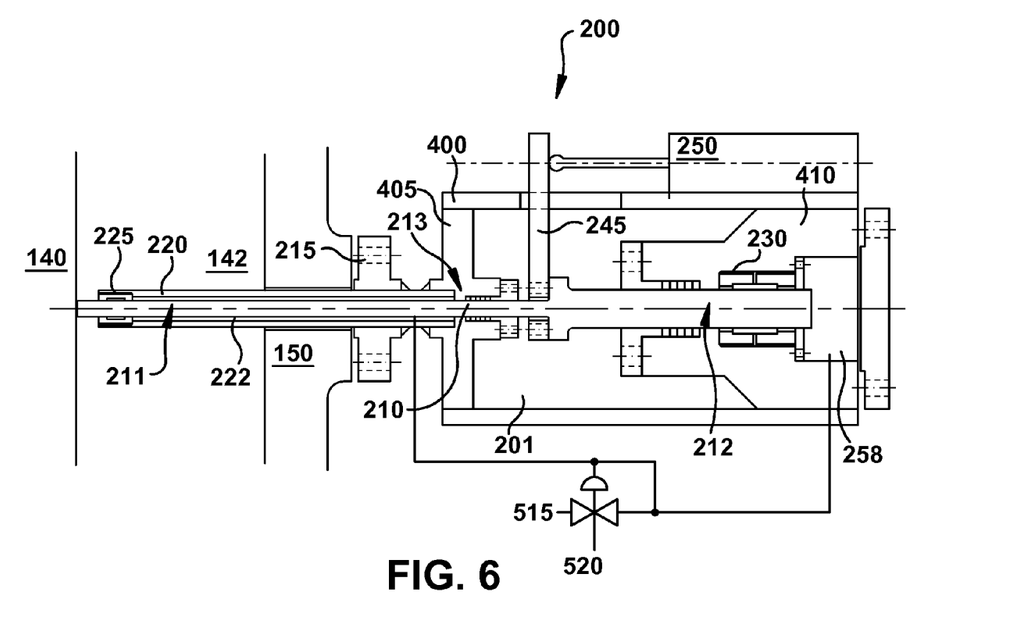
FIG. 6 shows a shell differential expansion detector in accordance with an embodiment of the invention.

As shown in FIGS. 4-6, shell differential expansion detector device 200 includes a housing 201 and a first rod 210. First rod 210 includes distal part 211 and proximal part 212. Proximal part 212 is disposed within housing 201, and distal part 211 extends through first opening 213 in housing 201. Distal part 211 of first rod 210 has a first diameter, and proximal part 212 of first rod 210 has a second, larger diameter such that proximal part 212 has a larger diameter and end surface area than distal part 211. Distal part 211 of first rod 210 is surrounded by sleeve 220, disposed on an exterior of housing 201. Sleeve 220 protects first rod 210 from vortex buffeting, from turbulence from exhausted steam that could impact the accuracy of shell differential expansion detector 200, and from fatigue failure. In some embodiments, sleeve 220 may be perforated or slotted, providing for decreased weight, decreased potential for plugging annulus 222, and decreased potential for condensation of steam in annular space 222 during shutdowns. Sleeve 220 may have an inner diameter that is slightly larger than the outer diameter of first rod 210, creating an annular space 222 between first rod 210 and sleeve 220. A first sleeve bearing 225 may be disposed in annular space 222, between sleeve 220 and distal part 211 of first rod 210, such that first sleeve bearing 225 supports distal part 211 in sleeve 220. In FIGS. 4-6, first sleeve bearing 225 is depicted near a distal end of distal part 211, however first sleeve bearing 225 may be axially positioned anywhere along distal part 211 of first rod 210. As shown in FIGS. 4-6, a second sleeve bearing 230 may be disposed about proximal part 212 of first rod 210, supporting proximal part 212 in housing end member 410.

In some embodiments, as shown in FIGS. 4-6, housing 201 may include housing body 400, housing distal flange member 405, and housing end member 410. Housing body 400 may be substantially cylindrically shaped. At a distal end of housing body 400, housing distal flange member 405 may be affixed to housing body 400 by, e.g., welding. Housing distal flange member 405 supports guard sleeve 220 and first gland 235 (discussed further below). As shown in FIG. 4, on a proximal end, housing body 400 may be affixed to housing end member 410, which fits within housing body 400, and supports second gland 240 (discussed further below), forming part of pressure chamber 258. Housing proximal flange member 415 (FIG. 4) may be affixed using, e.g., bolts 420, to housing end member 410 to provide a positive seal on pressure chamber 258 and facilitate assembly of device 200. In some embodiments, second gasket 505 may be used, although in other embodiments second gasket 505 may be absent.

In the embodiment of FIG. 4, distal part 211 of first rod 210 passes through an opening in outer shell 150, and into space 142 between outer shell 150 and inner shell 140. First rod 210 is kept in contact at its distal end with a surface of inner shell 140 by a balance of pressure. Pressure between inner shell 140 and outer shell 150 acts on distal part 211 of first rod 210, and would force first rod 210 out of outer shell 150 if not balanced by a reactive force. This reactive force is provided in this embodiment by steam pressure provided to pressure chamber 258 by steam pressure supply line 255. Steam pressure supply line 255 may direct steam from annular space 222 between sleeve 220 and distal part 211 of first rod 210 to pressure chamber 258 disposed inside housing 201 and adjacent to a proximal end of proximal part 212 of first rod 210. In other embodiments, steam may also be taken from a separate pressure tap and carried by supply line 255 to pressure chamber 258. From there, steam pressure in pressure chamber 258 provides force on first rod 210 in a distal direction, i.e., toward inner shell 140. This forces first rod 210 distally, such that distal part 211 maintains contact with inner shell 140.

Steam may be delivered at an approximate pressure of about 1379 kPa (about 200 psi), although this is merely exemplary; higher and lower pressures may be used depending on operating conditions of turbomachine 100 (FIG. 1). Steam pressure supply line 255 may further include a valve 260 for adjusting the steam pressure provided to pressure chamber 258, and therefore the balance of forces that determine the axial position of first rod 210. Steam pressure supply line 255 may further include drain 265 to release condensation if necessary, to, e.g., a condenser or waste water drain.

As inner shell 140 expands and contracts relative to outer shell 150, first rod 210 moves axially in the proximal and distal directions respectively, retaining contact between a distal end of distal part 211 and the outer surface of inner shell 140. The ratio of the area of the distal tip of distal part 211 to the area of the proximal tip of proximal part 212 of first rod 210, and the relative applied pressure at both ends of first rod 210 establish a force balance that keeps the rod in contact with a surface of inner shell 140 over the full range of motion of first rod 210 that results from the expansion and contraction of inner shell 140 during operation of turbomachine 100. In one embodiment, first rod 210 has a range of axial travel of about 2.5 cm to about 5.1 cm. The continuous contact between first rod 210 and inner shell 140 contributes to the accuracy of shell differential expansion detector 200.

First gland 235 may further be provided for sealing the mating surfaces of first opening 213 of the housing distal flange member 405 and distal part 211 of the first rod 210. Similarly, second gland 240 may also be provided for sealing the mating surfaces of proximal part 212 of first rod 210 and housing end member 410. First and second glands 235, 240 may be, e.g., valve-stem packings that include low resistance packing. Such low resistance packing may not substantially impede or resist axial movement of first rod 210. First and second glands 235, 240 do not substantially restrict the movement of first rod 210 within housing 201. Movement of first rod 210 is controlled by the axial clearance between actuator arm 245 and first gland 235; proximal part 212 of first rod 210 and second gland 240; proximal part 212 of first rod 210 and housing proximal flange member 415; or actuator arm 245 and second opening 214 in housing 201. First rod 210 is thus able to function over large axial travel distances. First and second glands 235, 240 minimize steam leakage from the turbine section and pressure chamber 258.

In other embodiments, depicted in FIGS. 5-6, axial movement of first rod 210 may be actuated using a number of other mechanisms. As shown in FIG. 5, axial movement of first rod 210 may be actuated by spring 510, which may be disposed about proximal part 212 of first rod 210. Spring 510 may be, e.g., a coil spring. As shown in FIG. 6, axial movement of first rod 210 may also be pneumatic-actuated, using a compressed air supply, or hydraulic-actuated, using a hydraulic unit. Fluid or gas as respectively appropriate may be supplied to pressure chamber 258 via feed 515, and adjusted via bleed 520. In a case in which movement is pneumatic-actuated, a diameter of proximal part 212 may be larger than if hydraulic-actuated.

Referring to FIGS. 4-6, sleeve 220 may further include a flange 215 affixed thereto, for connection of shell differential expansion detector 200 to outer shell 150 via bolts 216 (labeled in FIG. 4) or other connection devices or methods. Flange 215 may also be, e.g., welded to sleeve 220. Flange 215 may or may not include a first gasket 500 for sealing.

As shown in FIGS. 4-6, actuator arm 245 is securely affixed to first rod 210. In the embodiment shown in FIG. 4, actuator arm 245 may be bolted to first rod 210, and may extend substantially perpendicularly relative to first rod 210, and through a second opening 214 in housing 201. Second rod 248 is disposed such that a distal end of second rod 248 is maintained in physical contact with actuator arm 245. Second rod 248 may be substantially parallel relative to first rod 210 as shown in FIG. 4, and may be on an exterior of housing 201. Second arm 248 is operably connected at a proximal end thereof with a shell expansion detector 250.

Shell expansion detector 250 is an electro-mechanical device which converts the mechanical energy generated by movement of first rod 210, which actuates movement of actuator arm 245 and second rod 248, into an electrical signal which may be useful for validation, monitoring, and active clearance control applications. The electrical signal may be transmitted from shell expansion detector 250 to computing device 350 via lead 340 (FIG. 4).

Because shell differential expansion detector device 200 is affixed to outer shell 150 via flange 215 in the embodiments shown in FIGS. 4-6, the measurement isolates the relative expansion and/or contraction of inner shell 140 relative to outer shell 150. Outer shell expansion 170 (FIG. 1) relative to rotor 110 (FIG. 1) can be measured using a differential expansion detector using known techniques. Together, the measurements of outer shell 150 expansion relative to rotor 110, and of inner shell 140 expansion relative to outer shell 150 as determined using shell differential expansion detector 200, allow an inner shell 140 expansion 180 (FIG. 1) relative to rotor 110 to be accurately determined.

Referring back to FIG. 3, this figure illustrates in greater detail how data measured by shell differential expansion detector 200 may be used in connection with other measurements to calculate differential expansion 176 of inner shell 140 relative to rotor 110. A number of variables may be used: differential expansion distance (DXD) 175, outer shell expansion ($\Delta X_O$) 170, expansion of the turbine end of the outer shell ($\Delta X_{OTE}$) 174, expansion of the generator end of the outer shell ($\Delta X_{OGE}$) 172, inner shell expansion ($\Delta X_I$) 180, and rotor expansion ($\Delta X_R$) 177. Each of measurements 174 $\Delta X_{OTE}$, DXD 175, and $\Delta X_R$ 177 are measured relative to a reference point axially aligned with thrust bearing 165. Differential expansion (DXD) 175 may be, e.g., measured using a device similar to shell expansion detector device 250. $\Delta X_{OGE}$ 172, $\Delta X_{OTE}$ 174, and $\Delta X_R$ 177 may be measured using known techniques, e.g., $\Delta X_R$ 177 may be measured using probe 182. $\Delta X_{OGE}$ 172 and $\Delta X_{OTE}$ 174 are generally small relative to outer shell expansion ($\Delta X_O$) 170.

The differential expansion of outer shell 150 relative to rotor 110 can be determined using the equation:

$$DXD \sim \Delta X_R - (\Delta X_O + \Delta X_{OTE} + \Delta X_{OGE})$$

which determines the difference between the expansion 177 of rotor 110 and the collective expansion of outer shell 150.

The differential expansion 176 of inner shell 140 relative to outer shell 150 can be determined using the equation:

$$SDXD \sim \Delta X_I - \Delta X_O$$

which determines the difference between outer shell 150 expansion 170 and inner shell 140 expansion 180.

These determinations can be used to determine the relative expansion 180 of inner shell 140 relative to the expansion 177 of rotor 110 using the equation:

$$\Delta X_R - \Delta X_I \sim DXD - SDXD + \Delta X_{OTE} + \Delta X_{OGE}$$

This information may provide the ability to validate differential expansion analyses, more accurate monitoring of stage differential expansion in the field, and the ability to provide more accurate feedback for active clearance control systems for clearance between inner shell 140 and rotor 110. In some embodiments, the foregoing measurements may further be compensated to account for growth of first rod 210 due to temperature within outer shell 150. This may be done in any of several ways as understood in the art, including direct measurement of the temperature of first rod 210, or using the steam temperature to calibrate device 200 and/or shell differential expansion calculator 364 (discussed further below) to correct for thermal expansion of first rod 210.

In any event, upon measuring a differential shell expansion, which is equal to the difference between inner shell expansion 180 and outer shell expansion 170, shell expansion detector 250 transmits a signal representing the differential shell expansion value to computing device 350.

As shown in FIG. 4, computing device 350 includes a processing unit 346, a memory 352, and input/output (I/O) interfaces 348 operably connected to one another by pathway 354, which provides a communications link between each of the components in computing device 350. Further, computing device 350 is shown in communication with display 356, external I/O devices/resources 358, and storage unit 360. I/O resources/devices 358 can comprise one or more human I/O devices, such as a mouse, keyboard, joystick, numeric keypad, or alphanumeric keypad or other selection device, which enable a human user to interact with computing device 350 and/or one or more communications devices to enable a device user to communicate with computing device 350 using any type of communications link.

In general, processing unit 346 executes computer program code 362 which provides the functions of computing device 350. Modules, such as shell differential expansion calculator module 364, which is described further herein, are stored in memory 352 and/or storage unit 360, and perform the functions and/or steps of the present invention as described herein. Memory 352 and/or storage unit 360 can comprise any combination of various types of computer readable data storage media that reside at one or more physical locations. To this extent, storage unit 360 could include one or more storage devices, such as a magnetic disk drive or an optical disk drive. Still further, it is understood that one or more additional components not shown in FIG. 4 can be included in computing device 350. Additionally, in some embodiments one or more external devices 358, display 356, and/or storage unit 360 could be contained within computing device 350, rather than externally as shown, in the form of a computing device 350 which may be portable and/or handheld.

Computing device 350 can comprise one or more general purpose computing articles of manufacture capable of executing program code, such as program 362, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program 362 can be embodied as any combination of system software and/or application software.

Further, program 362 can be implemented using a module such as shell differential expansion calculator 364 or set of modules 366. In this case, shell differential expansion calculator 364 can enable computing device 350 to perform a set of tasks used by program 362, and can be separately developed and/or implemented apart from other portions of program 362. As used herein, the term "component" means any configuration of hardware, with or without software, which implements the functionality described in conjunction therewith using any solution, while the term "module" means program code that enables a computing device 350 to implement the actions described in conjunction therewith using any solution. When fixed in memory 352 or storage unit 360 of a computing device 350 that includes a processing unit 346, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computing device 350.

When computing device 350 comprises multiple computing devices, each computing device can have only a portion of program 362 fixed thereon (e.g., one or more modules 364, 366). However, it is understood that computing device 350 and program 362 are only representative of various possible equivalent computer systems that may perform a process described herein. To this extent, in other embodiments, the functionality provided by computing device 350 and program 362 can be at least partially implemented by one or more computing devices that include any combination of general and/or specific purpose hardware with or without program code, including but not limited to a handheld measuring device for shell expansion. In each embodiment, the hardware and program code, if included, can be created using standard engineering and programming techniques, respectively.

When computing device 350 includes multiple computing devices, the computing devices can communicate over any type of communications link. Further, while performing a process described herein, computing device 350 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As noted, computing device 350 includes a shell differential expansion calculator module 364 for analyzing the signal provided by shell expansion detector 250 and converting it to a distance measurement. Using the measurements and equations discussed herein, shell expansion calculator module 364 may calculate a difference in expansion of the inner shell 140 (FIG. 1) relative to rotor 110 as discussed above.

As previously mentioned and discussed further herein, shell differential expansion detector 200 has the technical effect of enabling measurement of the expansion of inner shell 140 of turbomachine 100 (FIG. 1) relative to the expansion of outer shell 150, and determining the expansion of inner shell 140 relative to rotor 110 based on the measurement data. This measurement may be used to aid in operation of the turbomachine to avoid axial contact between stationary and rotating parts. The measurement may also provide design feedback to facilitate the use of smaller axial clearances between rotating and stationary parts which can result in smaller axial clearances between the rotating and stationary parts, better packing and tip sealing effectiveness, higher thermal efficiency, and performance in future turbomachines (i.e. design validation.) It is understood that some of the various components shown in FIG. 2 can be implemented independently, combined, and/or stored in memory for one or more separate computing devices that are included in computing device 350.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A device comprising:
    a housing;
    a first rod including a distal part extending through a first opening in the housing and a proximal part within the housing;
    a sleeve surrounding the distal part of the first rod on an exterior of the housing;
    an actuator arm affixed to the first rod and extending substantially perpendicularly relative to the first rod;
    a second rod having a proximal end and a distal end, wherein the second rod is substantially parallel to the first rod, and wherein the distal end of the second rod is in physical contact with the actuator arm; and
    a shell expansion detector operably connected with the proximal end of the second rod.

2. The device of claim 1, wherein the distal part of the first rod has a first diameter, and the proximal part of the first rod has a second diameter, wherein the second diameter is greater than the first diameter.

3. The device of claim 1, further comprising:
    a first sleeve bearing disposed in an annular space between the sleeve and the distal part of the first rod such that the first sleeve bearing supports the distal part of the first rod in the sleeve; and
    a second sleeve bearing supporting the proximal part of the first rod in the housing.

4. The device of claim 3, further comprising:
    a steam pressure supply line for directing steam from the annular space between the sleeve and the distal part of the first rod to a steam chamber disposed inside the housing and adjacent to a proximal end of the proximal part of the first rod.

5. The device of claim 4, wherein the steam pressure supply line further includes a valve for adjusting a steam pressure.

6. The device of claim 4, wherein the steam pressure supply line further includes a drain.

7. The device of claim 1, further comprising:
    a first gland for sealing the first opening of the housing and the distal part of the first rod;

a second gland for sealing the proximal part of the first rod and the housing.

8. The device of claim 1, wherein the first rod has a range of axial travel of about 2.5 cm to about 5.1 cm.

9. The device of claim 1, further comprising a flange affixed to the sleeve, wherein the flange is mounted to a shell of a turbomachine.

10. The device of claim 1, wherein the sleeve is one of perforated and slotted.

11. A turbomachine comprising:
a rotor;
a stator surrounding the rotor;
an inner shell;
an outer shell; and
an expansion detector device including:
a housing affixed to an exterior of the outer shell;
a first rod including a distal part extending through a first opening in the housing and a proximal part within the housing;
a sleeve surrounding the distal part of the first rod on an exterior of the housing;
an actuator arm affixed to the first rod;
a second rod in physical contact at a distal end thereof with the actuator arm; and
a shell expansion detector operably connected with the second rod at a proximal end thereof,
wherein the first rod and the sleeve are inserted through an opening in the outer shell, and the distal part of the first rod is maintained in contact with the inner shell.

12. The turbomachine of claim 11, wherein the distal part of the first rod has a first diameter, and the proximal part of the first rod has a second diameter, wherein the second diameter is greater than the first diameter.

13. The turbomachine of claim 11, further comprising:
a first sleeve bearing disposed in an annular space between the sleeve and the distal part of the first rod such that the first sleeve bearing supports the distal part of the first rod in the sleeve; and
a second sleeve bearing supporting the proximal part of the first rod in the housing.

14. The turbomachine of claim 13, further comprising:
a steam pressure supply line for directing steam from the annular space between the sleeve and the distal part of the first rod to a steam chamber disposed inside the housing and adjacent to a proximal end of the proximal part of the first rod.

15. The turbomachine of claim 14, wherein the steam pressure supply line further includes a valve for adjusting a steam pressure.

16. The turbomachine of claim 14, wherein the steam pressure supply line further includes a drain.

17. The turbomachine of claim 11, further comprising:
a first gland for sealing the first opening of the housing and the distal part of the first rod;
a second gland for sealing the proximal part of the first rod and the housing.

18. The turbomachine of claim 11, wherein the first rod has a range of axial travel of about 2.5 cm to about 5.1 cm.

19. The turbomachine of claim 11, further comprising a flange affixed to the sleeve, wherein the flange is mounted to the outer shell.

20. The turbomachine of claim 11, wherein the sleeve is one of perforated and slotted.

\* \* \* \* \*